US012783487B2

(12) United States Patent
Jiang et al.

(10) Patent No.: US 12,783,487 B2
(45) Date of Patent: Nov. 3, 2026

(54) BUILDING AND USING SPARSE INDEXES FOR DATASET WITH DATA SKEW

(71) Applicant: INTERNATIONAL BUSINESS MACHINES CORPORATION, Armonk, NY (US)

(72) Inventors: Peng Hui Jiang, Beijing (CN); Sheng Yan Sun, Beijing (CN); Xiao Xiao Chen, Beijing (CN); Ying Zhang, Beijing (CN); Jun Su, Beijing (CN); Li Xue An, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 18/166,035

(22) Filed: Feb. 8, 2023

(65) Prior Publication Data

US 2024/0264991 A1 Aug. 8, 2024

(51) Int. Cl.
*G06F 16/22* (2019.01)

(52) U.S. Cl.
CPC .......... *G06F 16/2228* (2019.01); *G06F 16/22* (2019.01)

(58) Field of Classification Search
None
See application file for complete search history.

(56) References Cited

U.S. PATENT DOCUMENTS

| | | | | |
|---|---|---|---|---|
| 5,758,145 | A | 5/1998 | Bhargava et al. | |
| 10,860,556 | B2 | 12/2020 | Oks et al. | |
| 11,321,296 | B1 * | 5/2022 | Rivers | G06F 16/2272 |
| 2007/0162506 | A1 * | 7/2007 | Grosman | G06F 16/278 |
| 2014/0379725 | A1 | 12/2014 | Choe et al. | |
| 2016/0335295 | A1 | 11/2016 | Desai et al. | |
| 2018/0307857 | A1 * | 10/2018 | Beecham | G06F 16/9024 |
| 2021/0191908 | A1 * | 6/2021 | Lott | G06N 20/00 |
| 2022/0245116 | A1 | 8/2022 | Rivers et al. | |
| 2022/0309112 | A1 * | 9/2022 | Qu | G06F 16/137 |
| 2023/0153284 | A1 * | 5/2023 | Walters | G06F 16/24578 707/741 |

OTHER PUBLICATIONS

Wangda Zhang; Exploiting Data Skew for Improved Query Performance; IEEE; pp. 1-14 (Year: 2020).*
Nguyen, Duc Hai et al., "SIDI: A Scalable In-Memory Density-based Index for Spatial Databases," DIDC '16, Jun. 2016, 8 pages.
(Continued)

*Primary Examiner* — Ann J Lo
*Assistant Examiner* — Jermaine A Mincey
(74) *Attorney, Agent, or Firm* — Eric Chesley, Esq.; Blanche E. Schiller, Esq.; Heslin Rothenberg Farley & Mesiti P.C.

(57) ABSTRACT

A dataset is determined to include skewed data and based on determining that the dataset includes skewed data, one or more sparse indexes for the skewed data of the dataset are built. A sparse index of the one or more sparse indexes is for a range of data of the skewed data, and the building the sparse index includes indicating one pointer for a selected record of the range of data and indicating another pointer for another selected record of the range of data. The sparse index is provided to be used in a query of the dataset.

20 Claims, 8 Drawing Sheets

(56) References Cited

OTHER PUBLICATIONS

Bailey, Chris, "Describing and Summarizing Data," https://openbooks.library.unt.edu/quatitative-analysis-exss/chapter/summarizing-and-describing-data, downloaded from internet Nov. 7, 2022, pp. 1-60.

Ding, Jialin et al., "Tsunami: A Learned Multi-dimensional Index for Correlated Data and Skewed Workloads," Proceedings of the VLDB Endowment, vol. 14, Issue 2, Oct. 2022, pp. 74-86.

Kondylakis, Haridimos et al., "Coconut: A Scalable Bottom-Up Approach for Building Data Series Indexes," Proceedings of the VLDB Endowment, vol. 11, Issue 6, Aug. 2018, pp. 677-690.

* cited by examiner

BUILDING AND USING SPARSE INDEXES FOR DATASET WITH DATA SKEW

BACKGROUND

One or more aspects relate, in general, to facilitating processing within a computing environment, and in particular, to improving such processing, as it relates to datasets stored within the computing environment.

A dataset is a collection of data that relates to a particular subject. The data of a dataset is stored in a data structure. For instance, the data may be stored in one or more tables in which each row corresponds to a given record of the data. In one example, the tables are database tables of a database, and the dataset corresponds to one or more database tables. To facilitate retrieval of data from the dataset, one or more indexes are used. For instance, one or more database indexes are used to improve retrieval of the data from the tables. An index is a data structure that includes information for quick access to selected data of the dataset.

Data within a dataset may be skewed. Data skew is a non-uniform distribution of the data in the dataset. The data may be skewed to the left or the right, in which the data is concentrated to the left or right.

Data skew may cause poor load balancing and lead to high response times when performing, for instance, dataset queries.

SUMMARY

Shortcomings of the prior art are overcome, and additional advantages are provided through the provision of a computer-implemented method of facilitating processing within a computing environment. The computer-implemented method includes determining that a dataset includes skewed data. Based on determining that the dataset includes skewed data, one or more sparse indexes for the skewed data of the dataset are built using a computing device of the computing environment. A sparse index of the one or more sparse indexes is for a range of data of the skewed data, and the building the sparse index includes indicating one pointer for a selected record of the range of data and indicating another pointer for another selected record of the range of data. The sparse index is provided to be used in a query of the dataset.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
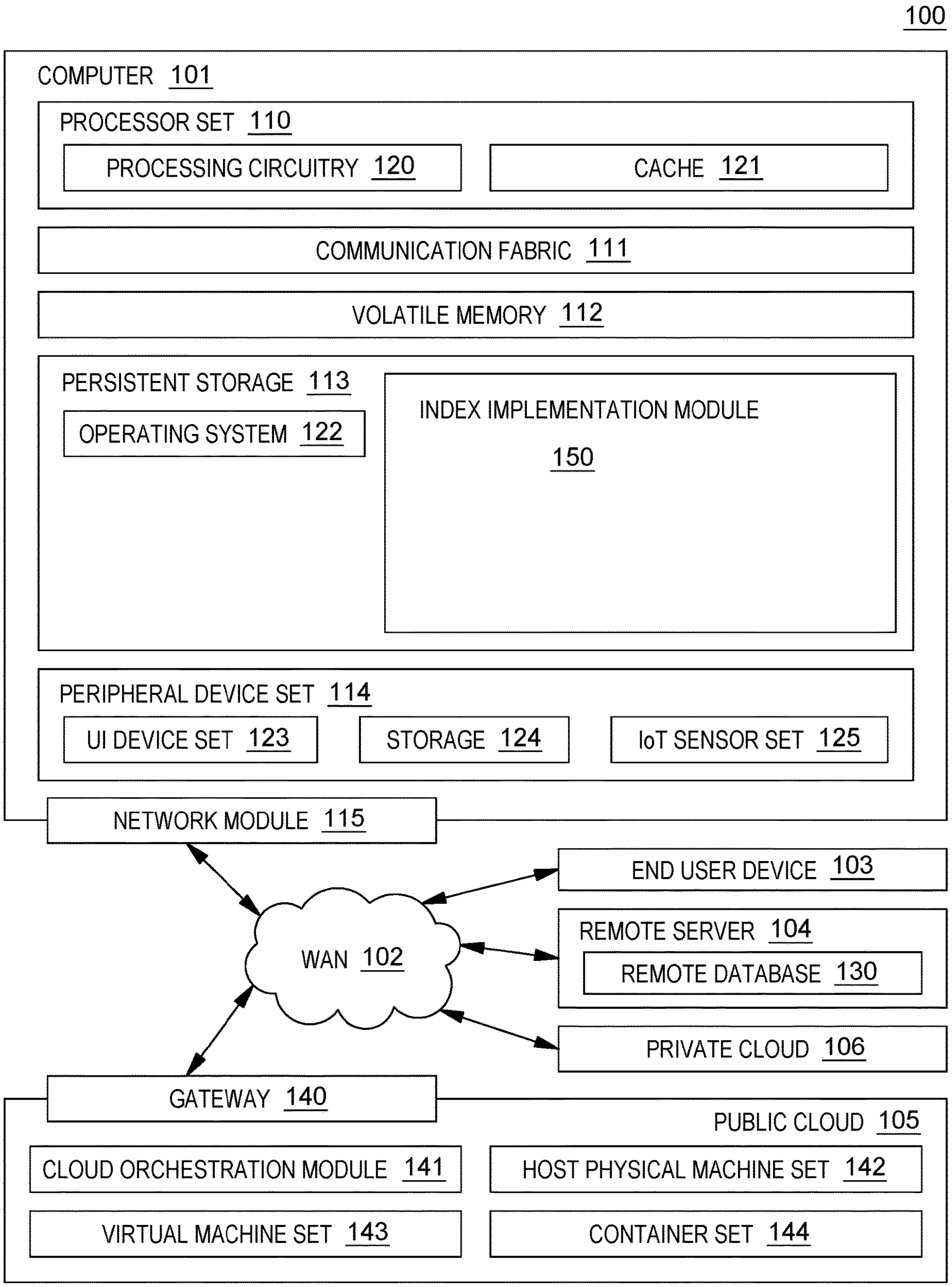
FIG. 1 depicts one example of a computing environment to perform, include and/or use one or more aspects of the present invention.

In one or more aspects, a capability is provided to facilitate access to skewed data (also referred to as non-uniform or non-uniformly distributed data) of a dataset. The capability includes, for instance, implementing (e.g., building and using) one or more sparse indexes to be used to access the skewed data. The capability further includes, in one example, implementing one or more dense indexes for the non-skewed data (also referred to as uniform or uniformly distributed data) of the dataset. Further, in one or more aspects, the capability includes selecting for the data of the dataset which type of index or indexes (e.g., sparse index(es) and/or dense index(es)) are to be implemented for the dataset. The selection of indexes depends, for instance, on data distribution within a dataset, and, in accordance with one or more aspects of the present invention, the indexes may include one or more dense indexes, one or more sparse indexes or a mixed index which includes one or more dense indexes and one or more sparse indexes. Moreover, in one or more aspects, the capability includes adjusting an index distribution based on changes (e.g., dynamic changes) to the data distribution of the dataset. The adjusting the index distribution includes moving one or more sparse indexes to dense indexes (e.g., changing one or more index types from sparse to dense) and/or moving one or more dense indexes to sparse indexes (e.g., changing one or more index types from dense to sparse).

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., implements indexes and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as index implementation code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

Figure 2:
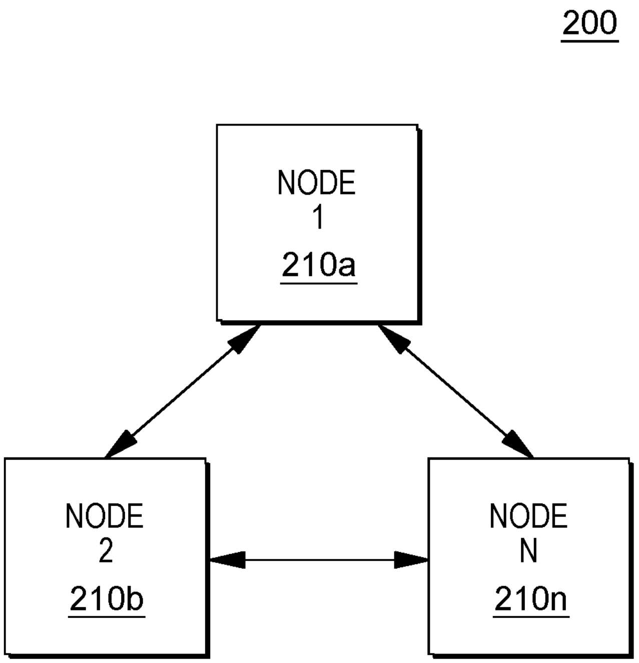
FIG. 2 depicts one example of a cluster of nodes, in accordance with one or more aspects of the present invention.

In one example, one or more components of FIG. 1, such as one or more computing devices (e.g., one or more computers (e.g., computer(s) 101) and/or servers (e.g., remote server(s) 104)) are nodes of a cluster of nodes. As shown in FIG. 2, a cluster of nodes 200 includes a plurality of nodes 210*a*-210*n* which communicate with one another to perform one or more operations. In one example, the cluster of nodes is a cluster of database nodes that connect to one or more databases and perform different operations (e.g., update, delete, insert, query) on the databases (e.g., different operations on the datasets of the databases). A cluster of nodes may include additional, fewer and/or other nodes than described herein. Further, although example nodes are mentioned herein, additional, fewer and/or other computers, servers and/or other computing devices may be nodes in the cluster of nodes. Many examples and/or configurations are possible.

Figure 3:
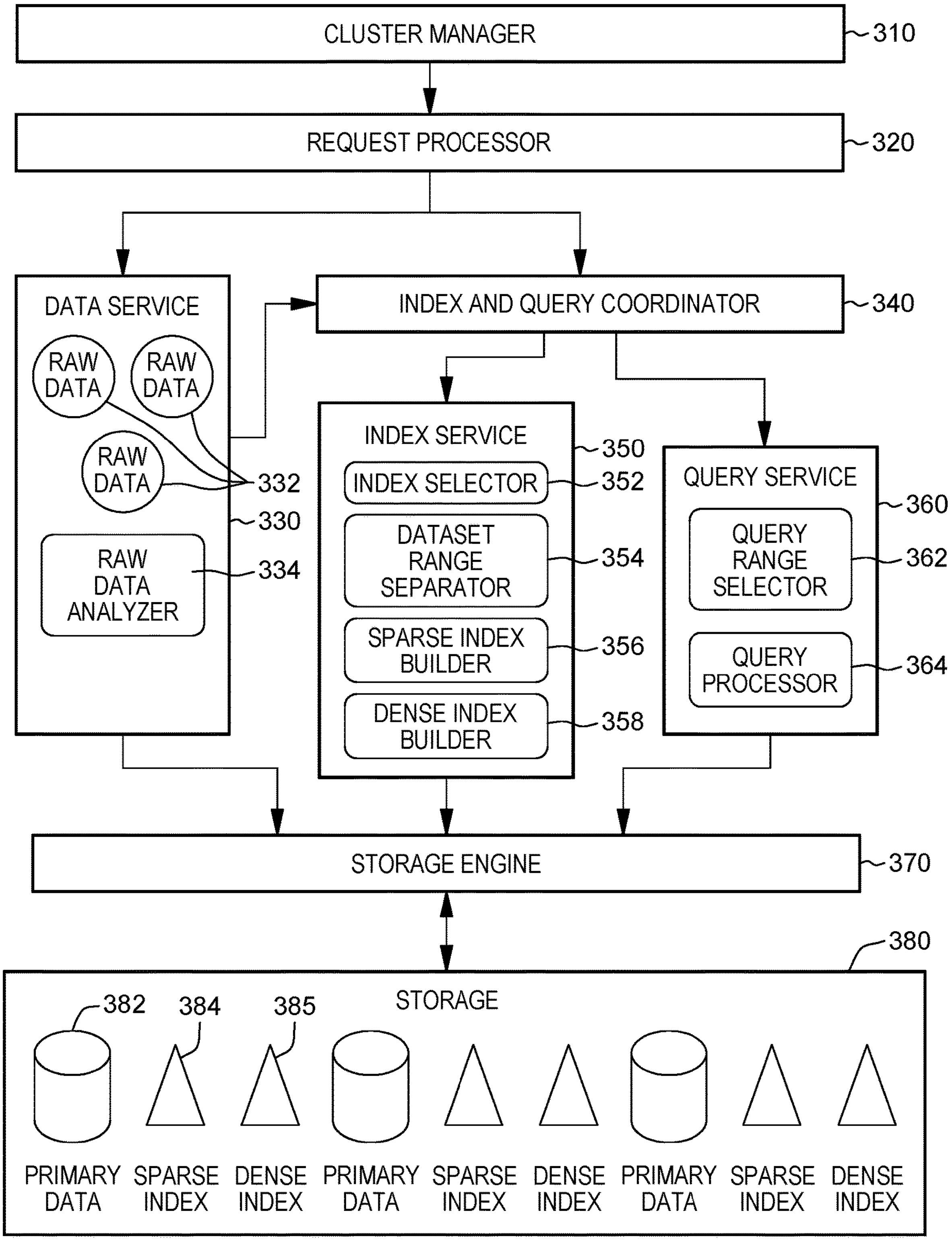
FIG. 3 depicts one example of further details of at least one node incorporating and using one or more aspects of the present invention.

A cluster of nodes, such as cluster 200, is managed, for instance, by a cluster manager. One example of a cluster manager is depicted in FIG. 3. Referring to FIG. 3, a cluster manager 310 manages coordination across the nodes of a cluster (e.g., cluster 200). In one example, cluster manager 310 is coupled to a request processor 320 of a node (e.g., one of nodes 210*a*-210*n*) that responds to requests from applications or clients for access to primary data 382 and indexes 384, 385 in storage 380 (e.g., storage 124, persistent storage 113, and/or other storage).

Request processor 320 is further coupled to a data service 330 and an index and query coordinator 340. In one example, data service 330 and index and query coordinator 340 may be part of a database engine. The database engine may be part of or coupled to a storage engine 370, which is coupled to a storage (e.g., storage 380). In one example, storage engine 370 manages the storage of data in each node. Request processor 320, data service 330, index and query coordinator 340 and storage engine 370 may be included in one node (or multiple nodes).

In one example, data service 330 is responsible for the core data storage and is used to optimize core data operations. Data service 330 includes, for instance, raw data 332 (e.g., original data) to be stored in one or more databases and a raw data analyzer 334 to analyze the data. It is coupled to, e.g., storage engine 370 and index and query coordinator 340.

Index and query coordinator 340 is responsible for coordinating the workload of an index service 350 and a query service 360 in one or more nodes and for shards of those nodes. A shard (also referred to as a database shard) is a portion of data in a dataset (or database). As an example, it is a horizontal partition or slice of data in a dataset (or database).

Index service 350 manages the workload to keep the index fresh including, in accordance with one or more aspects, determining one or more types of indexes to be implemented and building such indexes. As an example, index service 350 includes an index selector 352 to select one or more types of indexes to be built for the dataset; a dataset range separator 354 to separate data (e.g., skewed data) into different data ranges should there be skewed data; a sparse index builder 356 to build one or more sparse indexes for one or more data ranges should it be determined that one or more sparse indexes are to be built; and a dense index builder 358 to build one or more dense indexes should it be determined that one or more dense indexes are to be built. Index service 350 may include additional, fewer and/or different components.

Query service 360 is responsible for the execution of database or dataset queries, including parsing, optimizing, compiling and executing a plan to execute the queries to completion. In one example, query service 360 selects using, e.g., a query range selector 362, different query strategies based on one or more data ranges in a query, and those strategies may include, e.g., using an index or performing a full scan. One or more query processors 364 of query service 360 are used to perform one or more queries. Query service 360 may include additional, fewer and/or different components.

In one example, to implement one or more types of indexes to be used to query data of a dataset and/or to retrieve such data, an index implementation module (e.g., index implementation module 150) is used, in accordance with one or more aspects of the present invention. An index implementation module (e.g., index implementation module 150) includes code or instructions used to implement (e.g., build and use) one or more indexes of one or more types, in accordance with one or more aspects of the present invention. An index implementation module (e.g., index implementation module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and the computer readable program code may be executed by and/or using one or more computing devices (e.g., one or more computers, such as computer(s) 101; one or more servers, such as server(s) 104; one or more processors, such as processor(s) of processor set 110; processing circuitry, such as processing circuitry of processor set 110; and/or other computing devices, etc.) Additional and/or other computers, servers, processors, processing circuitry and/or other computing devices may be used to execute one or more of the sub-modules and/or portions thereof. Many examples are possible.

Figure 4:
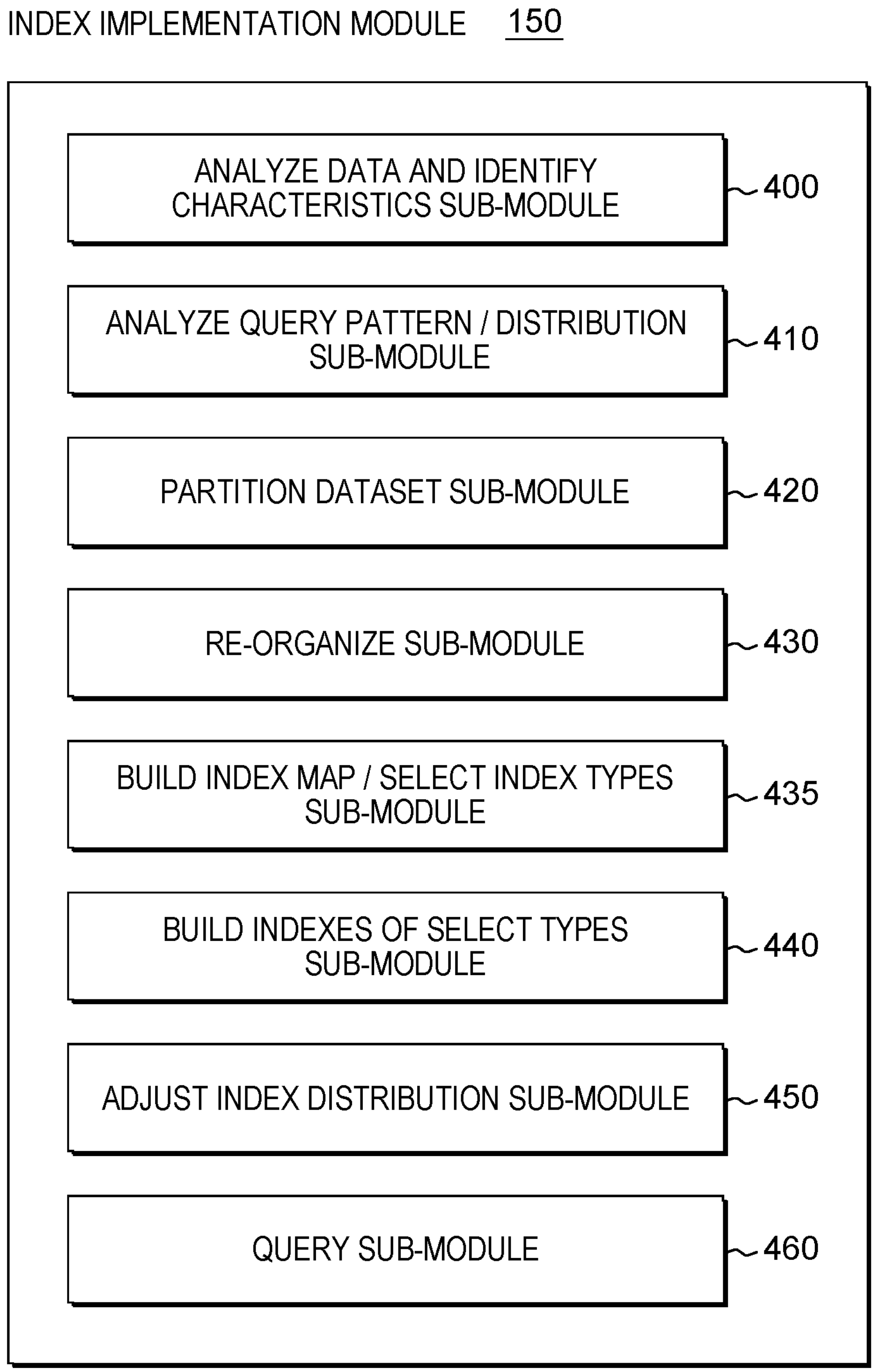
FIG. 4 depicts one example of sub-modules of an index implementation module of FIG. 1, in accordance with one or more aspects of the present invention.

One example of index implementation module 150 is described with reference to FIG. 4. In one example, index implementation module 150 includes an analyze data and identify characteristics sub-module 400 to analyze the data in a dataset and identify one or more characteristics of the dataset including, but not limited to, one or more statistical measures for the data in the dataset; an analyze query pattern/distribution sub-module 410 to analyze query patterns of the data, as well as distribution of search terms, to determine how the data is used; a partition dataset sub-module 420 to partition the dataset into multiple portions (slices) based on, e.g., the data analysis and/or query pattern/search terms analysis; a re-organize sub-module 430 to identify whether slices of the dataset belong to non-skewed data of the dataset or skewed data of the dataset and to tag the data appropriately; a build index map/select index types sub-module 435 to build an index map of indexes to be built of selected index types; a build indexes of select types sub-module 440 to build the one or more types of indexes for the data; an adjust index distribution sub-module 450 to adjust an index distribution (e.g., sparse and/or dense indexes) according to changes in the data distribution (e.g., dynamic changes); and a query sub-module 460 to perform one or more queries on the dataset. Although various sub-modules are described, an index implementation module, such as index implementation module 150, may include additional, fewer and/or different sub-modules. A particular sub-module may include additional code, including code of other sub-modules, less code, and/or different code. Further, additional and/or other modules may be used to implement one or more indexes. Many variations are possible.

The sub-modules are used, in accordance with one or more aspects of the present invention, to implement one or more indexes, as further described with reference to FIG. 5. In one example, an index implementation process is executed by one or more computing devices (e.g., one or more computers (e.g., computer 101, other computer(s), etc.), one or more servers (e.g., server 104, other server(s)), one or more processors and/or processing circuitry (e.g., of processor set 110 or other processor sets), and/or one or more other computer devices, etc.). Although example computing devices, computers, servers, processors and/or processing circuitry are provided, additional, fewer and/or other computing devices, computers, servers, processors, processing circuitry may be used for the index implementation process. Various options are possible.

Figure 5:
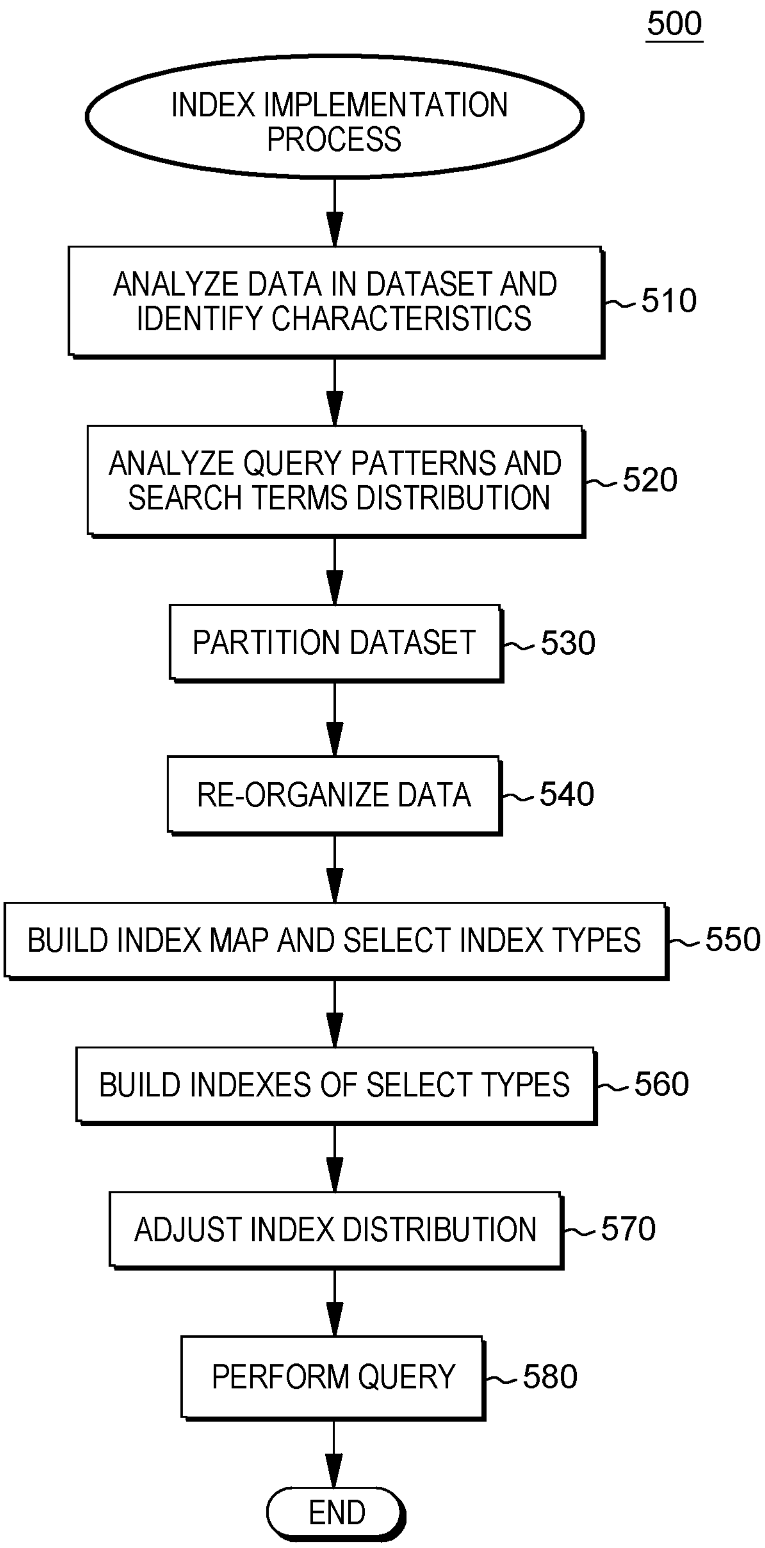
FIG. 5 depicts one example of index implementation processing, in accordance with one or more aspects of the present invention.

Referring to FIG. 5, in one example, an index implementation process 500 analyzes 510 data in a dataset and identifies one or more characteristics of the dataset, including, for instance, data values, timeline for the data, and/or one or more statistical measures, such as mode, median and/or mean. The mode is a value that appears most frequently in the data of the dataset; the median is a value in the middle of an ordered set of data (e.g., ascending order or descending order); and mean is an average of the data of the dataset. For a symmetrical or uniform distribution, the mean is approximately equal to the median and there is no skew. However, if the mean is less than the median, there is a negative skew to the left; and if the mean is greater than the median, there is a positive skew to the right. The skew may provide a long tail skewed to the left or right. As an example, a branch and bound technique may be used to analyze the data; however, additional and/or other techniques may be used, as well.

Further, in one example, process 500 analyzes 520 query patterns of the data, as well as distribution of search terms, to determine how the data is used. This is dynamic information that may change over time and is, for instance, determined at periodic intervals (e.g., at selected times, when a particular event occurs, at selected intervals, etc.). This analysis facilitates a determination of how the data is distributed and used and which type of indexes to be implemented. As examples, for a dataset or portions of a dataset that are searched often (e.g., based on predefined rule(s) or measure(s)), one or more dense indexes are used to avoid a table scan; and for a dataset or portions of a dataset that are searched infrequently (e.g., based on predefined rule(s) or measure(s)), one or more sparse indexes are used to save space and time used by dense indexes. Other possibilities exist.

Process 500 partitions 530 the dataset into a plurality of portions or data slices according to the analysis of the data, characteristics of the dataset, query patterns and/or distribution of search terms. For instance, the partitioning may be based on one or more of the following: data range of the dataset, data owner, data location, other metadata of the dataset, keywords/terms of one or more search queries, relationship of keywords/terms, search requestor, search context, search result context, query patterns, etc. As examples, the query patterns specify how to search against the dataset, including the searched location of the dataset, the time-serial distribution of the searched dataset, the ownership of the searched data, etc. The relationship of the search terms in a query include, for instance, AND, OR and NOT, etc. They can be used to include or exclude the dataset to be searched, including the skewed dataset.

In one example, the non-skewed data is partitioned into a plurality of portions or slices based on the data distribution/characteristics and/or query patterns/search term distribution, as described herein. The portions/slices may be evenly sized or differently sized. Any characteristics and/or technique may be used to determine the partitions. Further, the skewed data is partitioned into one or more portions/slices based on the data distribution/characteristics and/or query patterns/search term distribution, as described herein. The portions/slices may be evenly sized or differently sized. Any characteristics and/or technique may be used to determine the portions/slices.

Figure 6:
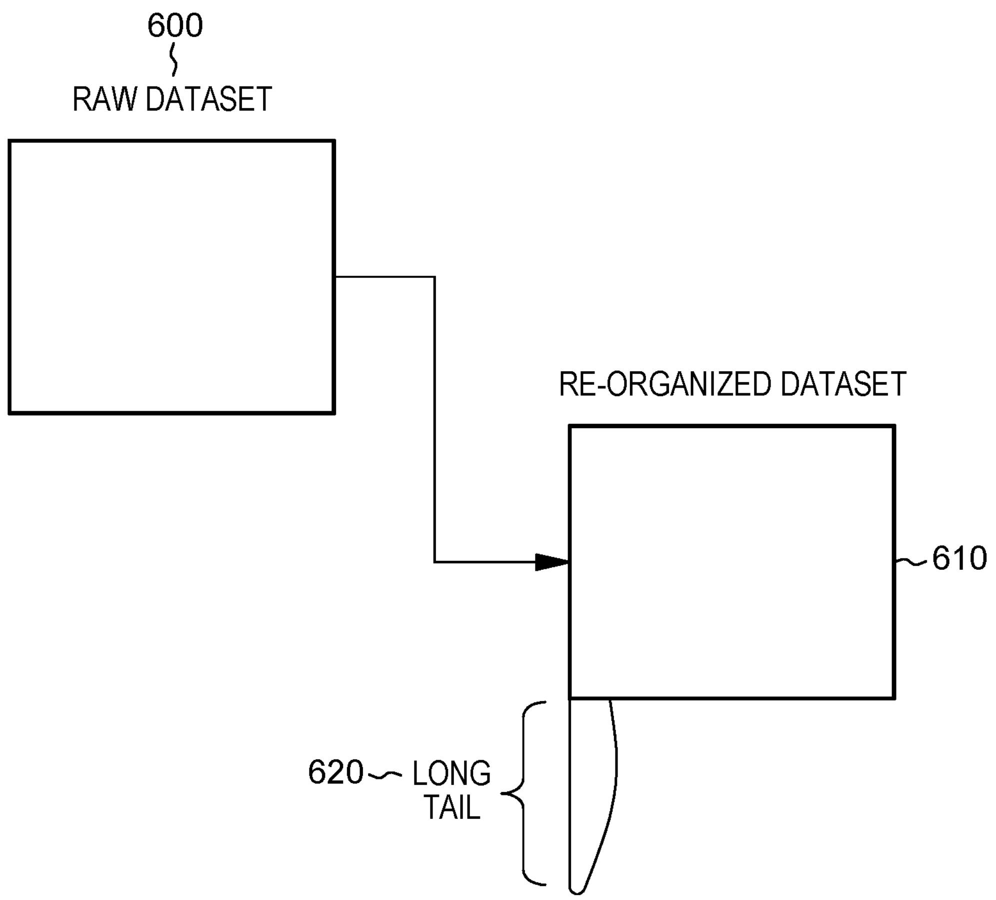
FIG. 6 depicts one example of a re-organized dataset with a long tail, in accordance with one or more aspects of the present invention.

Process 500 re-organizes 540 the raw data of the dataset identifying whether portions/slices of the dataset belong to the non-skewed data or the skewed data and tagging the data appropriately. For instance, as shown in FIG. 6, a raw dataset 600 is re-organized into a non-skewed portion 610 that includes data of the dataset that is not skewed as determined by, for instance, the one or more statistical measures and/or one or more of the analyses, and a skewed portion 620 (also referred to as a long tail) that includes data of the dataset that is skewed, as determined by, for instance, the one or more statistical measures and/or one or more of the analyses.

Returning to FIG. 5, process 500 builds 550 an index map and selects different types of indexes for the re-organized data of the dataset (e.g., the non-skewed data and skewed data). For instance, one or more dense indexes are selected for the non-skewed portions/slices of the dataset and one or more sparse indexes are selected for the skewed portion/slices of the dataset. A map of which index is for which portion/slice is created.

Based on the index map, process 500 builds 560 the one or more dense indexes for the non-skewed data and the one or more sparse indexes for the skewed data. For instance, to build a dense index, an index is built for each record of the dataset. As an example, the dense index is a dense clustering index, and an index record includes a search-key value and a pointer to a first data record with that search-key value. The remaining records with the same search-key value are stored sequentially after the first record (e.g., since the index is a clustering one, records are sorted on the same search key). Other types of dense indexes may be built.

Further, in one example, to build a sparse index, a starting point and an ending point are specified for a range of records of the dataset. For example, a pointer to a selected record (e.g., a first record in a range) and a pointer to another selected record (e.g., a last record of the range) are indicated. In this case, an index need not be built for each record of a range of records.

In one embodiment, the data distribution may change, e.g., over time (referred to herein as dynamic data distribution). This change may be determined at periodic intervals (e.g., at selected times, when a particular event occurs, at selected intervals, etc.). Process 500 adjusts 570 the index distribution according to the dynamic data distribution. For instance, a dense index may be moved to a sparse index and/or a sparse index may be moved to a dense index. That is, in one example, an index type may change from sparse to dense or from dense to sparse. Based on the change, the appropriate index is implemented. For instance, if the index type is changed from dense to sparse, at least one sparse index is built for one or more ranges of data. Similarly, if the index type is changed from sparse to dense, at least one dense index is implemented.

Further, in one or more aspects, process 500 performs a query 580 using the one or more dense indexes and one or more sparse indexes, depending on whether the data being queried is non-skewed or skewed.

Figure 7:
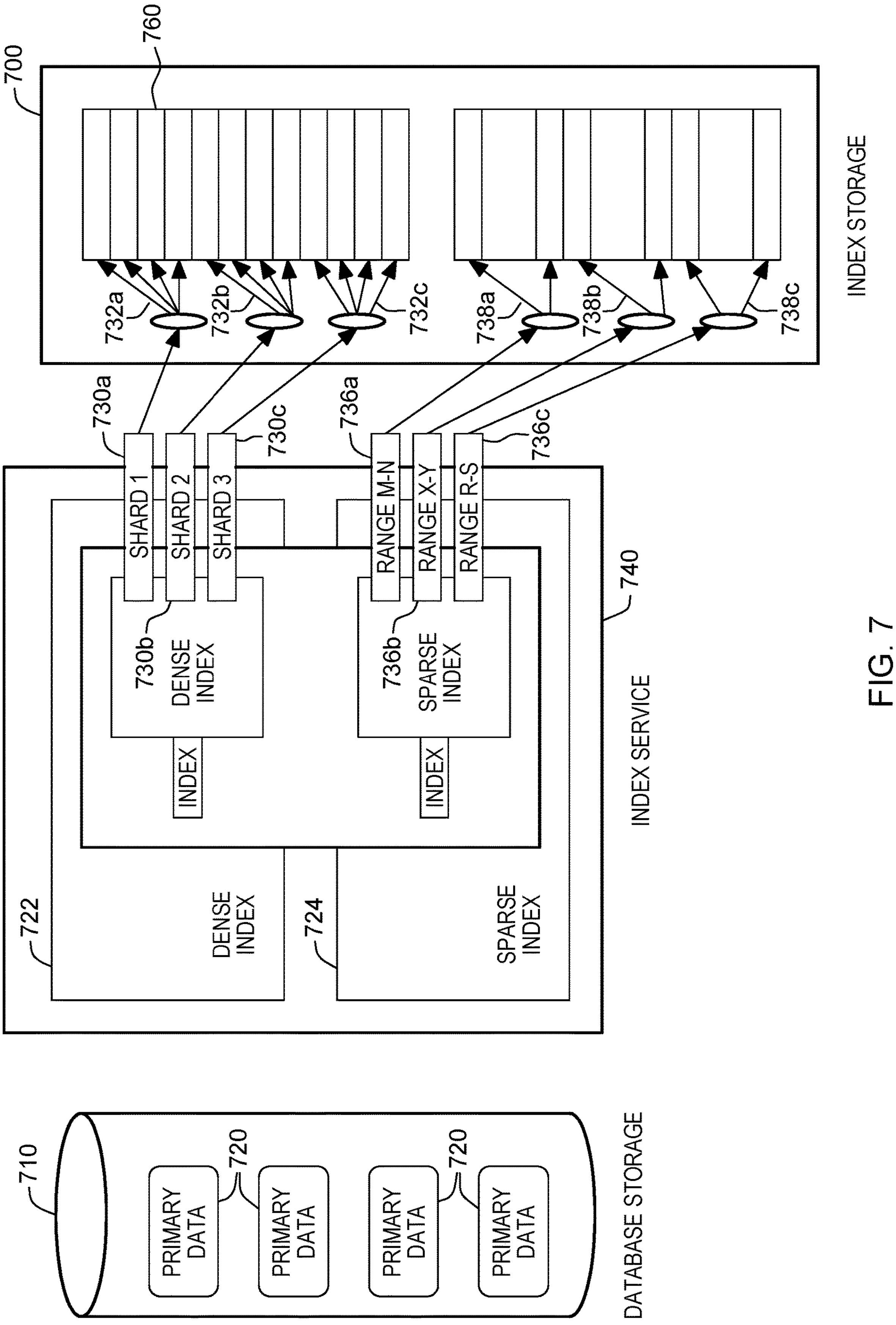
FIG. 7 depicts one example of different types of indexes for a dataset, in accordance with one or more aspects of the present invention.

Further details of implementing one or more indexes for a dataset are described with reference to FIG. 7, in which multiple types of indexes are built based on data distribution in the dataset. In one aspect, as depicted in FIG. 7, the indexes are maintained in a shared index storage 700 separate from a database (or dataset) storage 710 that stores the data, e.g., primary data 720. In one example, the indexes include one type of index, referred to as a dense index 722, and another type of index, referred to as a sparse index 724, built using an index service 740 (e.g., index service 350).

In accordance with one or more aspects, one or more dense indexes are created and used as indexes for non-skewed data. As an example, there is one set of dense indexes for each shard of the non-skewed data. For instance, there is a set of dense indexes 732*a* for a shard 730*a*, a set of dense indexes 732*b* for a shard 730*b* and a set of dense indexes 732*c* for a shard 730*c*. Each dense index is, e.g., a dense clustering index, in which the index record includes, e.g., a search-key value and a pointer to a selected (e.g., first) data record with that search-key value. The remaining records with the same search-key value are stored sequentially after the first record. In other examples, other types of dense indexes are created and used.

Further, in one or more aspects, there are one or more sparse indexes for the skewed data. As an example, there is one sparse index for each range of the skewed data. For instance, there is a sparse index 738*a* for one specified range of data (e.g., range M-N) 736*a*, a sparse index 738*b* for one specified range of data (e.g., range X-Y) 736*b*, and a sparse index 738*c* for one specified range of data (e.g., range R-S) 736*c*. Each sparse index includes, for instance, a starting pointer that points to a data record in the beginning of the range and an ending pointer that points to a data record at the end of the range. Other possibilities exist.

As described herein, in one or more aspects, a mixed index that includes one or more dense indexes and one or more sparse indexes is built and used for a dataset that includes non-skewed data and skewed data. This improves processing of the data, including searching the data, as well as storing of the indexes and/or the data, improving response times and storage access. Less space and maintenance overhead are used for insertions and deletions within a dataset. Further, an index may be adjusted dynamically, facilitating use of the indexes and/or processing associated therewith.

Described above is one example of index implementation processing. One or more aspects of the process may use machine learning. For instance, machine learning may be used to learn of data access usage (e.g., access frequencies, access patterns), query patterns, search terms distribution, to predict access usage, to predict query patterns, perform analysis and/or perform other tasks. A system is trained to perform analyses and learn from input data and/or choices made.

Figure 8:
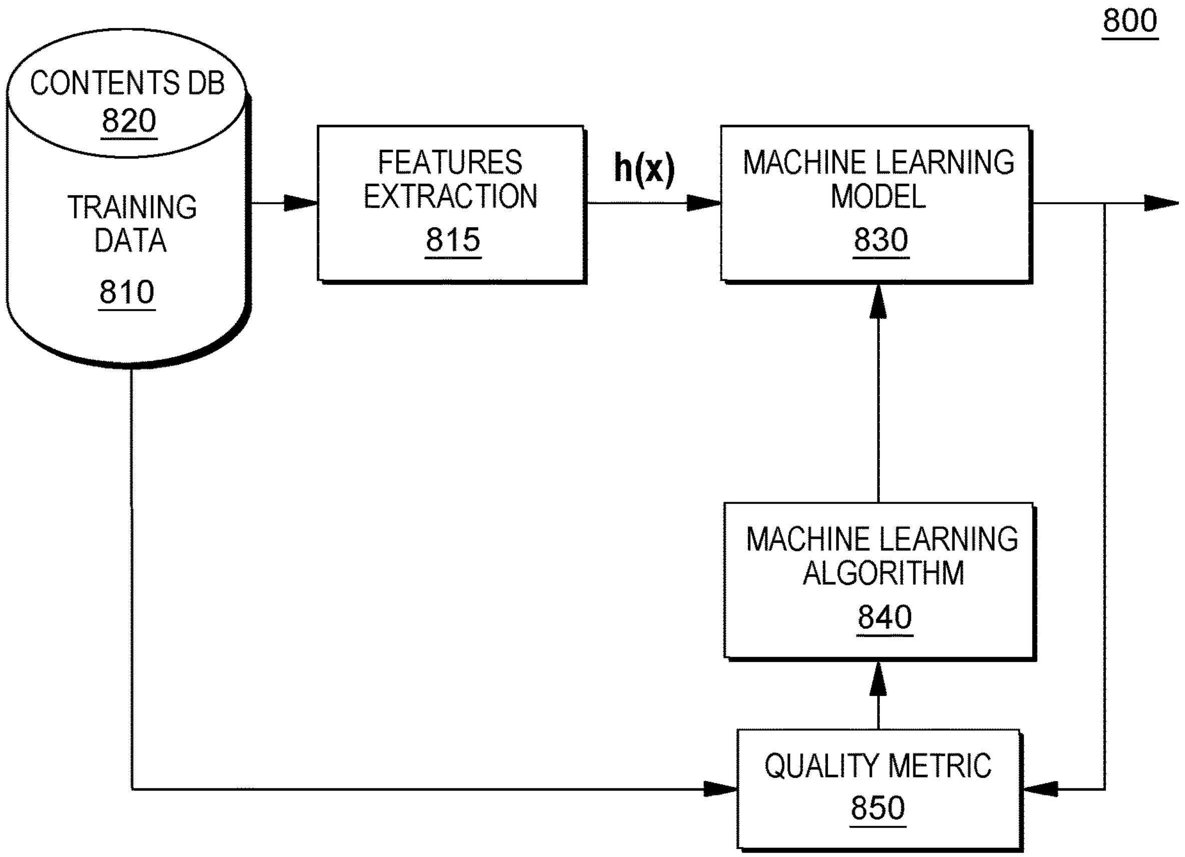
FIG. 8 depicts one example of a machine learning training system used in accordance with one or more aspects of the present invention.

FIG. 8 is one example of a machine learning training system 800 that may be utilized, in one or more aspects, to perform cognitive analyses of various inputs, including input data, data from one or more data structures and/or other data. Training data utilized to train the model in one or more embodiments of the present invention includes, for instance, data that pertains to one or more events, such as queries, usage frequency, usage patterns, data distribution, search terms distribution, etc. The program code in embodiments of the present invention performs a cognitive analysis to generate one or more training data structures, including algorithms utilized by the program code to predict states of a given event. Machine learning (ML) solves problems that are not solved with numerical means alone. In this ML-based example, program code extracts various attributes from ML training data 810 (e.g., historical data collected from various data sources relevant to the event), which may be resident in one or more databases 820 comprising event or task-related data and general data. Attributes 815 are utilized to develop a predictor function, h(x), also referred to as a hypothesis, which the program code utilizes as a machine learning model 830.

In identifying various event states, features, constraints and/or behaviors indicative of states in the ML training data 810, the program code can utilize various techniques to identify attributes in an embodiment of the present invention. Embodiments of the present invention utilize varying techniques to select attributes (elements, patterns, features, constraints, distribution, etc.), including but not limited to, diffusion mapping, principal component analysis, recursive feature elimination (a brute force approach to selecting attributes), and/or a Random Forest, to select the attributes related to various events. The program code may utilize a machine learning algorithm 840 to train the machine learning model 830 (e.g., the algorithms utilized by the program code), including providing weights for the conclusions, so that the program code can train the predictor functions that comprise the machine learning model 830. The conclusions may be evaluated by a quality metric 850. By selecting a diverse set of ML training data 810, the program code trains the machine learning model 830 to identify and weight various attributes (e.g., features, patterns, constraints, distributions, etc.) that correlate to various states of an event.

The model generated by the program code is self-learning as the program code updates the model based on active event feedback, as well as from the feedback received from data related to the event. For example, when the program code determines that there is a constraint, event or pattern (e.g., usage frequency, usage pattern, query pattern, data distribution, search terms distribution, etc.) that was not previously predicted by the model, the program code utilizes a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent (now known or later developed) to tune the model, based on data obtained from one or more data sources. In one or more embodiments, the program code interfaces with application programming interfaces to perform a cognitive analysis of obtained data. Specifically, in one or more embodiments, certain application programming interfaces comprise a cognitive agent (e.g., learning agent) that includes one or more programs, including, but not limited to, natural language classifiers, a retrieve and rank service that can surface the most relevant information from a collection of documents, concepts/visual insights, trade off analytics, document conversion, and/or relationship extraction. In an embodiment, one or more programs analyze the data obtained by the program code across various sources utilizing one or more of a natural language classifier, retrieve and rank application programming interfaces, and trade off analytics application programming interfaces. An application programming interface can also provide audio related application programming interface services, in the event that the collected data includes audio, which can be utilized by the program code, including but not limited to natural language processing, text to speech capabilities, and/or translation.

In one or more embodiments, the program code utilizes a neural network to analyze event-related data to generate the model utilized to predict the state of a given event at a given time. Neural networks are a biologically-inspired programming paradigm which enable a computer to learn and solve artificial intelligence problems. This learning is referred to as deep learning, which is a subset of machine learning, an aspect of artificial intelligence, and includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

One or more aspects of the present invention are tied to computer technology and facilitate processing within a computer, improving performance thereof. For instance, storage requirements and costs are reduced, along with processing time and resources to implement indexes. Response time for queries is improved. Processing within a processor, computer system and/or computing environment is improved.

Other aspects, variations and/or embodiments are possible.

The computing environments described herein are only examples of computing environments that can be used. One or more aspects of the present invention may be used with many types of environments. The computing environments provided herein are only examples. Each computing environment is capable of being configured to include one or more aspects of the present invention. For instance, each may be configured to implement indexes and/or to perform one or more other aspects of the present invention.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. Other types of indexes may be implemented. Further, other techniques may be used to determine the types of indexes to be built and/or used. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

determining that a dataset includes skewed data and indicating in storage the skewed data, wherein the skewed data is a non-uniform distribution of data in the dataset that is concentrated in one direction;

analyzing the data of the dataset to determine one or more types of data included in the dataset, wherein the skewed data is one type of data of the one of more types of data of the dataset, and wherein the analyzing the data determines that the one or more types of data include the skewed data and non-skewed data;

selecting one or more types of indexes to be built based on the one or more types of data of the dataset, wherein the selecting indicates that one or more sparse indexes are to be built for the skewed data and one or more dense indexes are to be built for the non-skewed data;

building, using a computing device of the computing environment, the one or more sparse indexes for the skewed data of the dataset, based on determining that the dataset includes skewed data, wherein a sparse index of the one or more sparse indexes is for a range of data records of the skewed data, and wherein the building the sparse index includes:

indicating one pointer for a selected data record of the range of data records; and indicating another pointer for another selected data record of the range of data records, wherein there is one sparse index for a plurality of data records included in the range of data records specified by the one pointer and the another pointer;

storing in selected storage the sparse index, the sparse index to be used in a query of the dataset;

determining that a distribution of the data of the dataset has changed; and adjusting an index distribution of one or more indexes of the dataset based on determining that the distribution of the data has changed.

2. The computer-implemented method of claim 1, wherein the determining that the dataset includes the skewed data includes computing one or more statistical measures to be used to determine that the dataset includes the skewed data.

3. The computer-implemented method of claim 1, further including building the one or more dense indexes for the non-skewed data.

4. The computer-implemented method of claim 1, wherein the adjusting the index distribution includes changing a type of an index of the one or more indexes from dense to sparse.

5. The computer-implemented method of claim 1, wherein the adjusting the index distribution includes changing a type of an index of the one or more indexes from sparse to dense.

6. The computer-implemented method of claim 1, further comprising analyzing one or more query patterns of one or more queries of the data of the dataset to facilitate selection of the one or more types of indexes to be built.

7. The computer-implemented method of claim 1, further comprising analyzing one or more search terms used to query the data of the dataset to facilitate selection of the one or more types of indexes to be built.

8. A computer system for facilitating processing within a computing environment, the computer system comprising:

a memory; and one or more processors in communication with the memory, wherein the computer system is configured to perform a method, said method comprising:

determining that a dataset includes skewed data and indicating in storage the skewed data, wherein the skewed data is a non-uniform distribution of data in the dataset that is concentrated in one direction;

analyzing the data of the dataset to determine one or more types of data included in the dataset, wherein the skewed data is one type of data of the one or more types of data of the dataset, and wherein the analyzing the data determines that the one or more types of data include the skewed data and non-skewed data;

selecting one or more types of indexes to be built based on the one or more types of data of the dataset, wherein the selecting indicates that one or more sparse indexes are to be built for the skewed data and one or more dense indexes are to be built for the non-skewed data;

building the one or more sparse indexes for the skewed data of the dataset, based on determining that the dataset includes skewed data, wherein a sparse index of the one or more sparse indexes is for a range of data records of the skewed data, and wherein the building the sparse index includes:

indicating one pointer for a selected data record of the range of data records; and indicating another pointer for another selected data record of the range of data records, wherein there is one sparse index for a plurality of data records included in the range of data records specified by the one pointer and the another pointer;

storing in selected storage the sparse index, the sparse index to be used in a query of the dataset;

determining that a distribution of the data of the dataset has changed; and adjusting an index distribution of one or more indexes of the dataset based on determining that the distribution of the data has changed.

9. The computer system of claim 8, wherein the method further includes building the one or more dense indexes for the non-skewed data.

10. The computer system of claim 8, wherein the adjusting the index distribution includes changing a type of an index of the one or more indexes from dense to sparse.

11. The computer system of claim 8, wherein the adjusting the index distribution includes changing a type of an index of the one or more indexes from sparse to dense.

12. A computer program product for facilitating processing within a computing environment, said computer program product comprising:

one or more computer readable storage media and program instructions collectively stored on the one or more computer readable storage media readable by at least one processing circuit to perform a method comprising:

determining that a dataset includes skewed data and indicating in storage the skewed data, wherein the skewed data is a non-uniform distribution of data in the dataset that is concentrated in one direction;

analyzing the data of the dataset to determine one or more types of data included in the dataset, wherein the skewed data is one type of data of the one or more types of data of the dataset, and wherein the analyzing the data determines that the one or more types of data include the skewed data and non-skewed data;

selecting one or more types of indexes to be built based on the one or more types of data of the dataset, wherein the selecting indicates that one or more sparse indexes are to be built for the skewed data and one or more dense indexes are to be built for the non-skewed data;

building the one or more sparse indexes for the skewed data of the dataset, based on determining that the dataset includes skewed data, wherein a sparse index of the one or more sparse indexes is for a range of data records of the skewed data, and wherein the building the sparse index includes:

indicating one pointer for a selected data record of the range of data records; and indicating another pointer for another selected data record of the range of data records, wherein there is one sparse index for a plurality of data records included in the range of data records specified by the one pointer and the another pointer; and storing in selected storage the sparse index, the sparse index to be used in a query of the dataset;

determining that a distribution of the data of the dataset has changed; and adjusting an index distribution of one or more indexes of the dataset based on determining that the distribution of the data has changed.

13. The computer program product of claim 12, wherein the method further includes building the one or more dense indexes for the non-skewed data.

14. The computer program product of claim 12, wherein the adjusting the index distribution includes changing a type of an index of the one or more indexes from dense to sparse.

15. The computer program product of claim 12, wherein the adjusting the index distribution includes changing a type of an index of the one or more indexes from sparse to dense.

16. The computer program product of claim 12, wherein the method further comprises analyzing one or more query patterns of one or more queries of the data of the dataset to facilitate selection of the one or more types of indexes to be built.

17. The computer-implemented method of claim 1, wherein the one sparse index is used for the plurality of data records included within the range of data records specified by the one pointer and the another pointer, rather than building an index for each data record of the plurality of data records.

18. The computer program product of claim 12, wherein the method further comprises analyzing one or more search terms used to query the data of the dataset to facilitate selection of the one or more types of indexes to be built.

19. The computer system of claim 8, wherein the method further comprises analyzing one or more query patterns of one or more queries of the data of the dataset to facilitate selection of the one or more types of indexes to be built.

20. The computer system of claim 8, wherein the method further comprises analyzing one or more search terms used to query the data of the dataset to facilitate selection of the one or more types of indexes to be built.

* * * * *